US010870249B2

(12) United States Patent
Scott et al.

(10) Patent No.: US 10,870,249 B2
(45) Date of Patent: Dec. 22, 2020

(54) ROTARY CUTTING TOOL FOR CUTTING SLITS IN TIRES AND RELATED SYSTEMS AND METHODS

(71) Applicant: Love Tap Racing, L.L.C., Kelley, IA (US)

(72) Inventors: John Scott, Odebolt, IA (US); Rick Sackett, Schaller, IA (US)

(73) Assignee: Love Tap Racing, L.L.C., Kelley, IA (US)

( * ) Notice: Subject to any disclaimer, the term of this patent is extended or adjusted under 35 U.S.C. 154(b) by 245 days.

(21) Appl. No.: 15/980,963

(22) Filed: May 16, 2018

(65) Prior Publication Data

US 2018/0333929 A1    Nov. 22, 2018

Related U.S. Application Data

(60) Provisional application No. 62/506,703, filed on May 16, 2017, provisional application No. 62/533,931, filed on Jul. 18, 2017.

(51) Int. Cl.
*B29D 30/68* (2006.01)

(52) U.S. Cl.
CPC ..................... *B29D 30/68* (2013.01)

(58) Field of Classification Search
None
See application file for complete search history.

(56) References Cited

U.S. PATENT DOCUMENTS

| 2,245,728 | A | * | 6/1941 | Sipe | B29D 30/68 157/13 |
| 2,829,689 | A | * | 4/1958 | Jarvis | A01F 29/06 241/187 |
| 6,526,725 | B1 | * | 3/2003 | Williams | B65B 61/205 493/379 |

\* cited by examiner

*Primary Examiner* — Brian D Keller
(74) *Attorney, Agent, or Firm* — Davis, Brown, Koehn, Shors & Roberts, P.C.; Matthew Warner-Blankenship (57) ABSTRACT

Disclosed herein are various rotary cutting tools in which each have a plurality of blades disposed on an outer surface of the cutting tool. Disclosed also are a variety of systems or apparatuses for maintaining or cutting rubber surfaces into which one or more of the cutting tools can be incorporated.

19 Claims, 7 Drawing Sheets

ROTARY CUTTING TOOL FOR CUTTING SLITS IN TIRES AND RELATED SYSTEMS AND METHODS

CROSS-REFERENCE TO RELATED APPLICATION(S)

This application claims the benefit under 35 U.S.C. § 119(e) to U.S. Provisional Application 62/506,703, filed May 16, 2017 and entitled "Rotary Knife and Methods of Using Same to Cut," and further to U.S. Provisional Application 62/533,931, filed Jul. 18, 2017 and entitled "Rotary Knife and methods of Using Same to Cut Thin Slits in Tires," both of which are hereby incorporated herein by reference in their entireties.

FIELD OF THE INVENTION

The various embodiments herein relate to devices and methods of siping and/or cutting slits in the surfaces of rubber materials, including the outer surfaces of tires.

BACKGROUND OF THE INVENTION

Siping is a process of cutting thin slits across a rubber surface, such as the surface of a vehicle tire, to improve traction in wet or icy conditions. The siping process was originally invented by John F. Sipe around 1920 as disclosed in U.S. Pat. No. 1,452,099. The resulting thin slits can be called "sipes," and tires having sipes can increase traction on roads covered with snow, ice, mud, and/or water.

Figure 1:
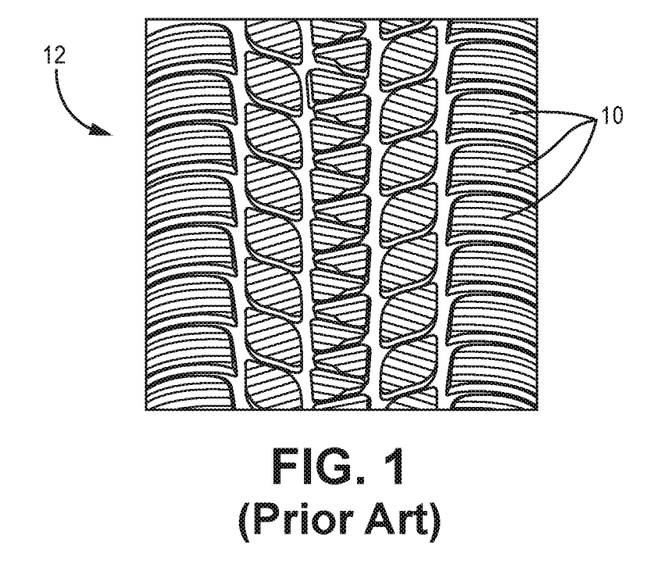
FIG. 1 is a front view of a known outer surface of a rubber tire.
Figure 2A:
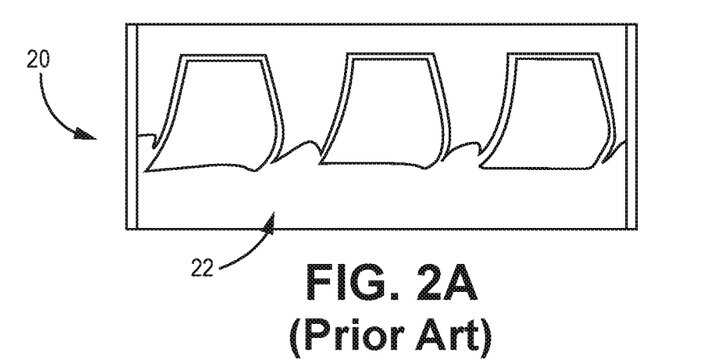
FIG. 2A is a cross-sectional view of a portion of a known outer surface of a rubber tire.
Figure 2B:
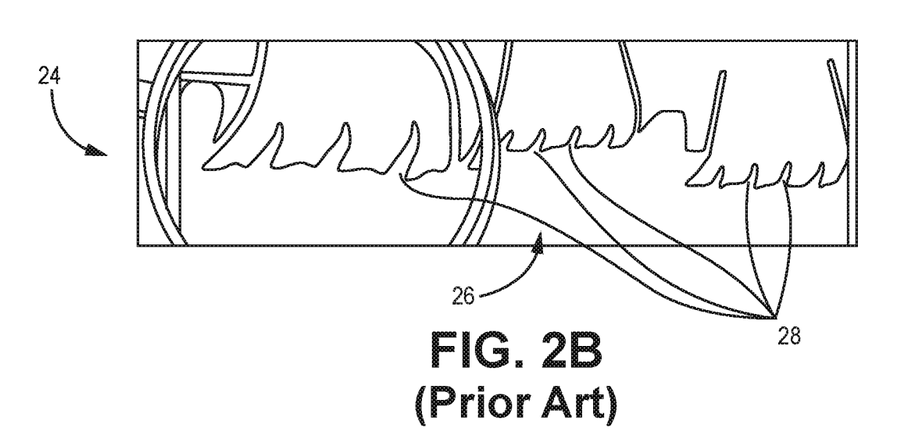
FIG. 2B is a cross-sectional view of a portion of a known outer surface of a rubber tire with sipes.

Sipes 10, according one example, are shown in FIG. 1. The sipes 10 are formed in the outer surface of a rubber tire 12. FIGS. 2A and 2B provide a cross-sectional comparison of the outer surface 22 of a tire 20 with no sipes and the outer surface 26 of a tire 24 with sipes 28.

There is a need in the art for improved systems, apparatuses, and methods for forming slits in rubber materials, including vehicle tires.

BRIEF SUMMARY OF THE INVENTION

Discussed herein are various devices and systems for cutting slits into rubber materials, including tires.

In Example 1, a rotary cutting apparatus comprises a cylindrical housing comprising an opening defined through a central axis of the cylindrical housing, wherein the housing is rotatable around the central axis, and a plurality of blades coupled to and extending outward from an outer surface of the cylindrical housing, each of the blades disposed at an angle in relation to the central axis of the cylindrical housing.

Example 2 relates to the rotary cutting apparatus according to Example 1, wherein the angle ranges from about 0 degrees to about 25 degrees in relation to the central axis.

Example 3 relates to the rotary cutting apparatus according to Example 1, wherein the angle is about 22.5 degrees in relation to the central axis.

Example 4 relates to the rotary cutting apparatus according to Example 1, wherein the cutting apparatus is rotatably disposed in a bracket of a rotatable handle, wherein the rotatable handle is rotatably coupled to a tire maintenance apparatus.

Example 5 relates to the rotary cutting apparatus according to Example 1, wherein the cylindrical housing further comprises a plurality of slots defined around an outer surface of the cylindrical housing, wherein each of the plurality of blades is disposed in one of the plurality of slots.

Example 6 relates to the rotary cutting apparatus according to Example 5, wherein each of the plurality of blades comprises a base disposed within one of the plurality of slots, a cutting portion extending from the base, wherein the cutting portion has a length that is shorter than a length of the base, and first and second shoulders defined at each end of the blade by the base and the cutting portion.

Example 7 relates to the rotary cutting apparatus according to Example 6, further comprising first and second end caps, wherein the first end cap is disposed against a first side of the cylindrical housing and the second end cap is disposed against a second side of the cylindrical housing.

Example 8 relates to the rotary cutting apparatus according to Example 7, wherein each of the first and second end caps comprises a lip, wherein each lip is disposed adjacent to one of the first and second shoulders.

In Example 9, a rotary cutting apparatus comprises a cylindrical housing comprising an opening defined through a central axis of the cylindrical housing, wherein the housing is rotatable around the central axis, and a plurality of slots defined around an outer surface of the cylindrical housing. The cutting apparatus further comprises a plurality of blades positioned in the plurality of slots, each of the blades comprising a base disposed within one of the plurality of slots, and a cutting portion extending from the base, wherein the cutting portion is shorter than the base such that first and second shoulders are defined by the base and the cutting portion. Further, the cutting apparatus also comprises a first end cap disposed adjacent to a first side of the cylindrical housing and a second end cap disposed adjacent to a second side of the cylindrical housing such that each of the plurality of blades is restrainedly disposed within one of the plurality of slots.

Example 10 relates to the rotary cutting apparatus according to Example 9, wherein the first end cap comprises a first lip disposed adjacent to the first shoulder and the second end cap comprises a second lip disposed adjacent to the second shoulder.

Example 11 relates to the rotary cutting apparatus according to Example 9, wherein each of the first and second end caps comprises a hole in fluid communication with the opening of the cylindrical housing.

Example 12 relates to the rotary cutting apparatus according to Example 9, wherein each of the plurality of slots is substantially parallel to adjacent slots of the plurality of slots.

Example 13 relates to the rotary cutting apparatus according to Example 9, wherein each of the plurality of slots is disposed at an angle in relation to the central axis of the cylindrical housing.

Example 14 relates to the rotary cutting apparatus according to Example 13, wherein the angle ranges from about 0 degrees to about 25 degrees in relation to the central axis.

Example 15 relates to the rotary cutting apparatus according to Example 9, wherein the cutting apparatus is rotatably disposed in a bracket of a rotatable handle, wherein the rotatable handle is rotatably coupled to an apparatus for cutting a tire.

In Example 16, a method of cutting slits into an outer surface of a tire comprises urging a handle comprising a rotary cutting apparatus disposed thereon toward the outer surface of the tire, contacting the rotary cutting apparatus to the outer surface of the tire, and rotating the tire, whereby slits are formed on the outer surface of the tire by the rotary cutting apparatus. The rotary cutting apparatus comprises a cylindrical housing comprising an opening defined through a central axis of the cylindrical housing, wherein the housing is rotatable around the central axis, and a plurality of blades coupled to and extending outward from an outer surface of the cylindrical housing, each of the blades disposed at an angle in relation to the central axis of the cylindrical housing.

Example 17 relates to the method according to Example 16, wherein the handle and the tire are operably coupled to a tire maintenance apparatus.

Example 18 relates to the method according to Example 16, wherein the handle further comprises a rotatable bracket assembly rotatably disposed on the handle, wherein the rotatable bracket assembly comprises at least two rotary cutting apparatus brackets, wherein the rotary cutting apparatus is rotatably disposed in one of the at least two rotary cutting apparatus brackets.

Example 19 relates to the method according to Example 18, further comprising at least a second rotary cutting apparatus rotatably disposed in another of the at least two rotary cutting apparatus brackets.

Example 20 relates to the method according to Example 19, further comprising rotating the rotatable bracket assembly to select one of the rotary cutting apparatuses for contacting to the outer surface of the tire.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various implementations disclosed or contemplated herein relate to a rotary cutting tool that can be used to cut or otherwise form thin slits such as, for example, sipes, in the outer surface of a tire. In certain embodiments, the tire is a racing tire used in racing cars or trucks. Alternatively, the sipes can be formed on any tire used on any vehicle.

Figure 3:
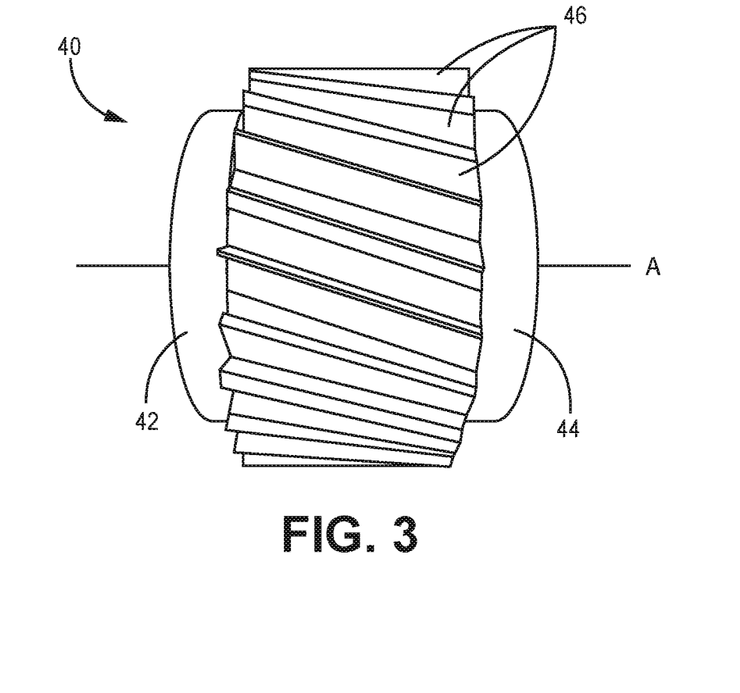
FIG. 3 is a front view of a rotary cutting tool, according to one embodiment.

FIG. 3 depicts one embodiment of the rotary cutting tool (also referred to herein as a "rotary knife") 40. The cutting tool 40 has two end caps 42, 44 and a plurality of blades 46 disposed around an outer circumference of the tool 40. As will be explained—and depicted—in further detail below with respect to other embodiments, the rotary tool 40 can have a through hole (or "lumen") (not shown) defined along the rotational axis A of the tool 40 such that the through hole extends through both end caps 42, 44 and the tool 40 and receives an axle or other elongate component (not shown) such that the tool 40 rotates around the axle (not shown) via the through hole (not shown).

In certain implementations, the blades 46 are positioned on the cutting tool 40 such that each blade 46 is disposed at an angle in relation to the rotational axis A of the tool 40. For example, the blades 46 as shown in FIG. 3 are positioned at an angle of about 22.5° in relation to the rotational axis A of the tool 40 according to one embodiment. Alternatively, the blades 46 can be positioned at an angle ranging from about 0° to about 25°. In a further alternative, the blades 46 can be positioned at any angle that provides a desirable angled sipe on the target tire. It is further shown that, in the depicted embodiment, the blades 46 are angled such that the left side of each blade is disposed at a higher point than the right side of each blade. Alternatively, it is understood that the blades 46 can also be angled such that the right side of each blade is disposed at a higher point than the left side. In a further alternative, the blades 46 are parallel to the rotational axis A.

Figure 4A:
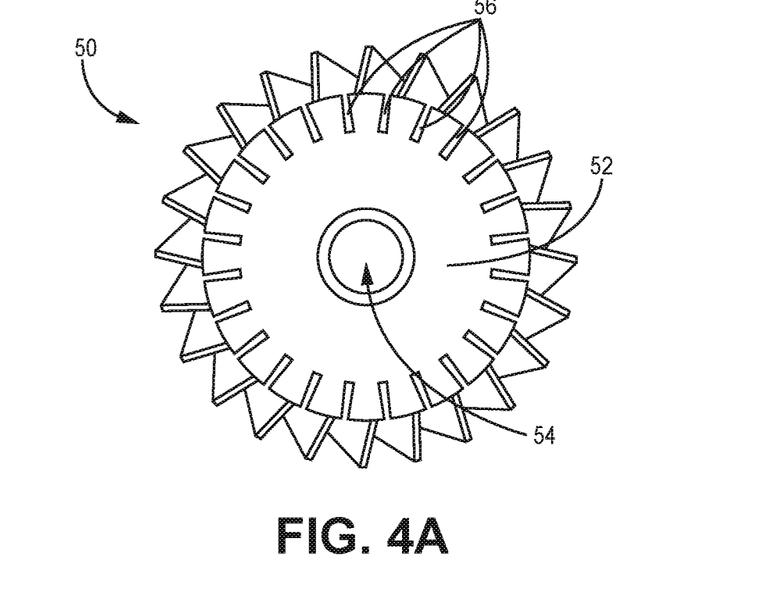
FIG. 4A is a side view of a rotary cutting tool housing, according to another embodiment.
Figure 4B:
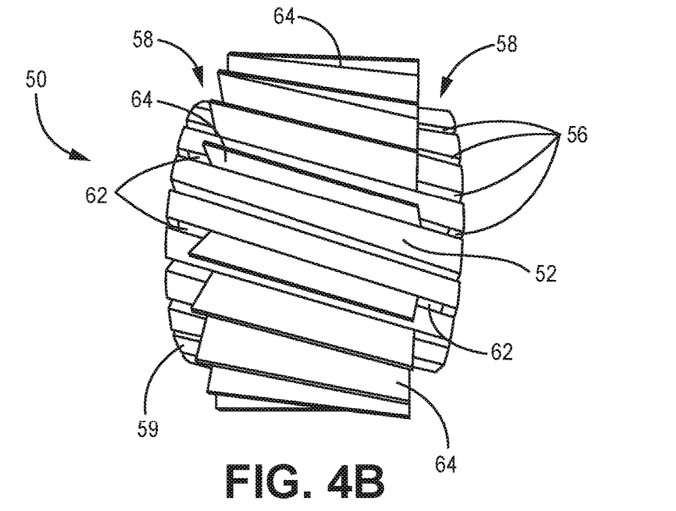
FIG. 4B is a front view of the rotary cutting tool housing of FIG. 4A, according to one embodiment.

In accordance with various embodiments as best shown in FIGS. 4A and 4B, a rotary cutting tool 50 can have a cylindrical tool housing 52 that has a through hole 54 through which the axle (not shown) is positioned. Further, the housing 52 has a plurality of blade slots 56 defined or otherwise formed around the outer surface 59 of the housing 52 such that each slot 56 is configured to receive a separate blade (such as, for example, the blade 60 depicted in FIG. 5). According to one embodiment, each slot 56 is about ⅛ inches deep. In this implementation as shown, the slots 56 are formed at an angle in relation to the through hole 54 of the housing 52. Because the blades are positioned in the slots 56, the slot 56 angles vary in the same fashion as the blade angles discussed above with respect to FIG. 3.

The housing 52, in certain implementations, is made of Delrin® plastic. Alternatively, the housing can be made of any known plastic that is sufficiently rigid and durable to serve as the housing for a rotary cutting tool. According to one embodiment, the housing 52 has a width of about 1.84 inches and a diameter of about 1.4375 inches and the through hole 54 can have a diameter of 0.3125 inches. Alternatively, the size of the housing 52 and the tool 50 can vary depending on the size of the tire to be siped and/or the size of the sipes to be formed in the tire. The dimensions disclosed herein are not intended to be limiting in view of the wide variation that is possible.

Figure 5:
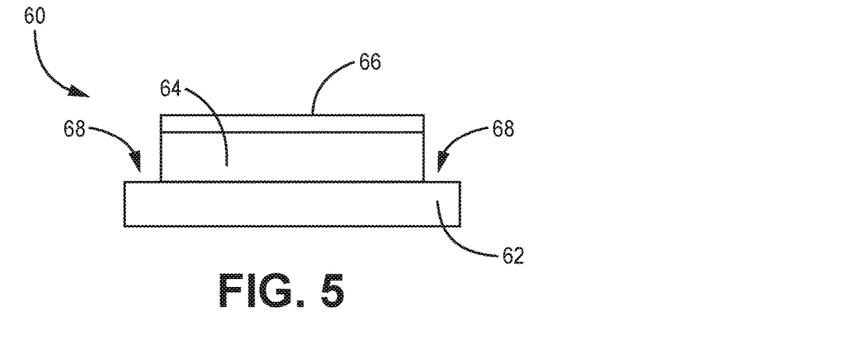
FIG. 5 is a perspective view of a blade, according to one embodiment.

FIG. 5 depicts a blade 60, according to one embodiment. The blade 60 has a base 62 and a cutting portion 64 with a sharpened cutting edge 66. The base 62 has a length that is greater than the length of the cutting portion 64, thereby creating a shoulder 68 on each end of the blade 60. In one implementation, the base 62 and cutting portion 64 are a single integral component that is formed by removing a portion of each end of the blade 60, thereby forming the shoulders 68. Alternatively, the base 62 and cutting portion 64 are fixedly coupled to each other. In accordance with one embodiment, the blade 60 is made of a bimetal material. Alternatively, the blade 60 can be made of any metal that can be used in a cutting device.

According to one embodiment, the base 62 has a length of about 1.84 inches, while the cutting portion 64 has a length of about 1.1875 inches. Alternatively, the cutting portion can range from about 1 inch to about 3 inches in length, thereby resulting in sipes that are about 1 inch to about 3 inches in length. In each such embodiment, the base length is a greater length by an amount that creates a shoulder on each end of the blade 60 as discussed elsewhere herein. In yet another alternative, the cutting portion can be any length necessary to cut a sipe of any desired length for any size tire. In a further alternative, as discussed elsewhere herein, the dimensions of the blade 60 can vary based on the possible variation of the dimensions of the housing 52.

Returning to FIGS. 4A and 4B, the blade 60 is coupled to the housing 52 in the following fashion. The base 62 of the blade 60 is configured to be positioned within a slot 56 in the housing 52 such that the cutting portion 64 extends outward from the tool housing 52, thereby ensuring that the cutting edge 66 is disposed outward from housing 52 as shown. Each slot 56 is filled in a similar fashion with a blade 60, such that the housing 52 has a plurality of cutting portions 64 of the blades 60 extending outward from the outer surface of the housing 52 as shown. Given that the length of the base 62 of each blade 60 is substantially the same as the width of the housing 52, shoulders 58 are created on each side of the housing 52 as shown.

Figure 6A:
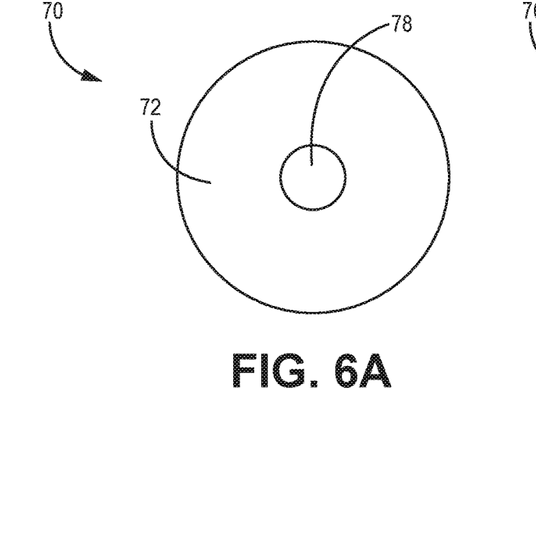
FIG. 6A is a front view of the outer surface of an end cap, according to one embodiment.
Figure 6B:
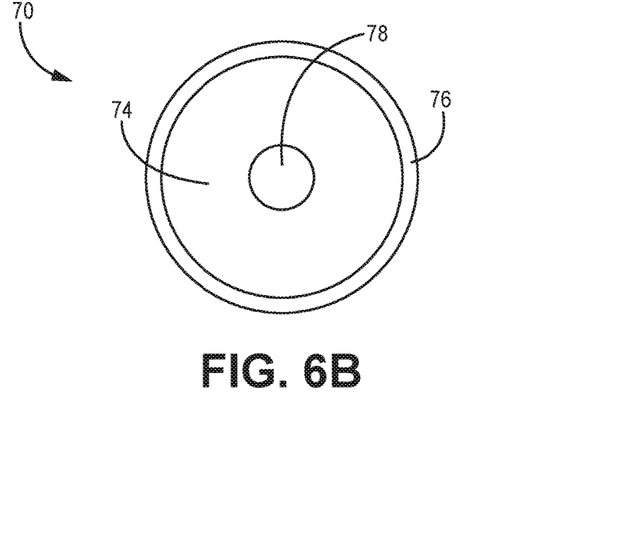
FIG. 6B is a back view of the inner surface of the end cap of FIG. 6B, according to one embodiment.

An end cap 70 is depicted in FIGS. 6A and 6B, according to one embodiment. The cap 70 has an outer surface 72 as best shown in FIG. 6A and an inner surface 74 and lip 76 as best shown in FIG. 6B. Further, the end cap 70 has an opening 78 defined through a substantially central portion of the cap 70 as shown. In one implementation, end caps 70 are coupled to each side of the housing 52—one end cap 70 on each side—such that each end cap 70 helps to retain the blades 60 in place within the slots 56 of the housing 52. That is, the lip 76 of the end cap 70 is wide enough such that when the inner surface 74 of the cap 70 is positioned against the housing 52, the lip 76 extends over the shoulder 58 and contacts or is positioned adjacent to the outer edge of the cutting portion 64 of each blade 60. With the lip 76 positioned over the shoulder 58, the lip 76 is positioned over the section of the base 62 of each blade 60 that extends outward past the length of the cutting portion 64, thereby blocking or retaining each base 62 within each slot 56. One example of two end caps 42, 44 coupled to a tool 40 in this fashion is shown in FIG. 3.

In one embodiment, the end cap 70 can have a diameter of about 1.5 inches. Alternatively, the end cap 70 can have any diameter that allows it to couple to and/or fit together with any rotary cutting tool of any known size for siping a tire. Further, the lip 76 has a width that is about equal to the width of the shoulder 58 as discussed above, thereby allowing the lip 76 to be positioned over the shoulder 58 as described elsewhere herein.

Alternatively, instead of a separate tool housing with separate end caps, etc., certain rotary tool implementations include a unitary rotary tool component having a single integral rotary tool component in which the tool housing and end caps are integral components of single unitary device with the plurality of blades extending therefrom in a fashion similar to the embodiments disclosed or contemplated above.

In use, any rotary tool embodiment can be incorporated into a standard racing tire preparation stand to be used to sipe a tire. It is understood that most racing teams utilize a commercially-available (or customized) mobile tire preparation stand that can be transported with the team to racing locations for on-site tire preparation. The exemplary embodiments of a stand depicted and discussed herein relate to such a standard, commercially-available mobile racing tire preparation stand. Alternatively, it is further understood that the rotary tool according to any implementation herein can be incorporated into the standard, commercially-available tire maintenance and repair equipment used in a standard tire repair shop, such as a local establishment or a shop that is part of a national chain.

Figure 7A:
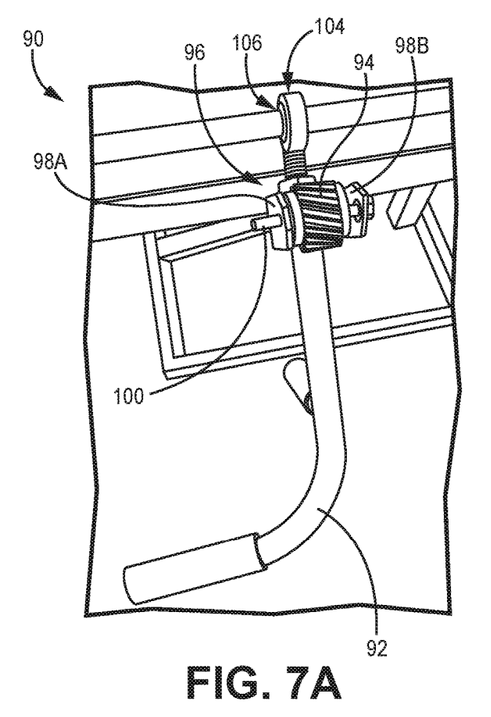
FIG. 7A is a perspective view of a rotary tool arm coupled to a known preparation stand, according to one embodiment.
Figure 7B:
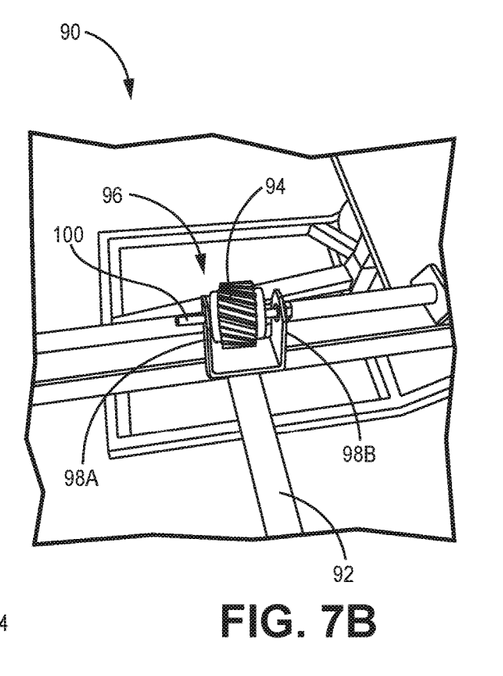
FIG. 7B is a close-up view of the rotary tool arm of FIG. 7A, according to one embodiment.
Figure 7C:
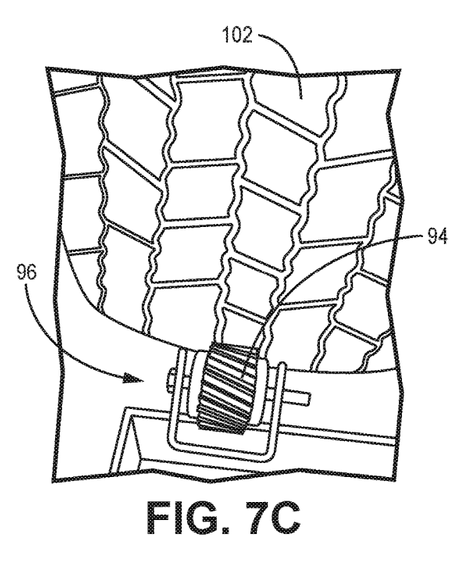
FIG. 7C is a close-up view of the rotary tool on the rotary tool arm of FIG. 7A positioned against a tire, according to one embodiment.

One exemplary implementation is depicted in FIGS. 7A-7C, in which the rotary tool 94 is rotatably mounted on or otherwise coupled to a handle 92 of the prep stand 90. In one embodiment, the handle 92 has a bracket 96 mounted thereon. The bracket 96 has two arms 98A, 98B that are positioned to receive the rotary tool 94 therebetween. Further, the bracket 96 has an axle 100 that is positioned through the openings of the end caps (such as the openings 78 of the end caps 70 described above) and the through hole of the tool (such as the through hole 54 of the tool 50 described above). As such, the rotary cutting tool 94 can be rotatably positioned in the bracket 96 on the handle 92. In certain embodiments, it is the bracket 96 and axle 100 that maintain the coupling of the end caps (such as end caps 70 discussed above) to the housing (such as the housing 52 discussed above) of the tool.

As best shown in FIG. 7A, in accordance with one implementation, the handle 92 has a coupling component 104 at the distal end thereof. The coupling component 104 as shown is a rotatable bar hole 104 with a rotatable opening 106 similar to the rotatable bar/pin holes found in standard three-point hitch devices. The rotatable bar hole 104 couples to the tire preparation stand 90 by positioning the bar hole 104 over the bar 108 of the stand 90 through the opening 106 as shown. Alternatively, any known coupling component 104 can be incorporated into or positioned at the distal end of the handle 92 for coupling to a known preparation stand or any other similar known tire repair equipment as discussed above. In a further alternative, the handle 92 is rotatably coupled to the stand 90 or any known preparation stand or other known tire repair equipment via any known mechanical component or feature.

According to one embodiment, the handle 92 is configured to rotate in relation to the prep stand 90, thereby allowing a user to rotate the handle 92 (and thus the rotary tool 94) toward the tire 102 until the rotary tool 94 is in contact with the tire 102 as best shown in FIG. 7C. In order to sipe or otherwise form thin cuts in the tire 102, the prep stand 90 is actuated to cause the tire to rotate, thereby causing the rotary tool 94 to rotate based on the contact friction between the tire 102 and the rotary tool 94, resulting in the plurality of blades on the tool 94 rotating. Thus, as the tire 102 rotates, the tool 94 rotates and each of the blades contacts a different portion of the outer surface of the tire 102. An appropriate amount of force is placed on the handle 92 by the user to ensure that the blades penetrate the outer surface of the tire 102 and thereby form the desired sipes.

Figure 8A:
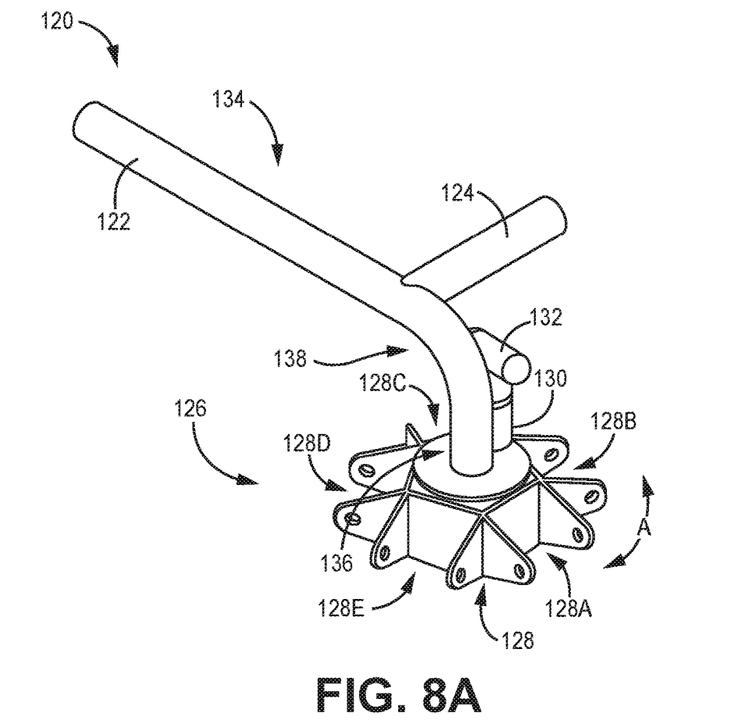
FIG. 8A is a perspective view of a rotary tool arm, according to another embodiment.
Figure 8B:
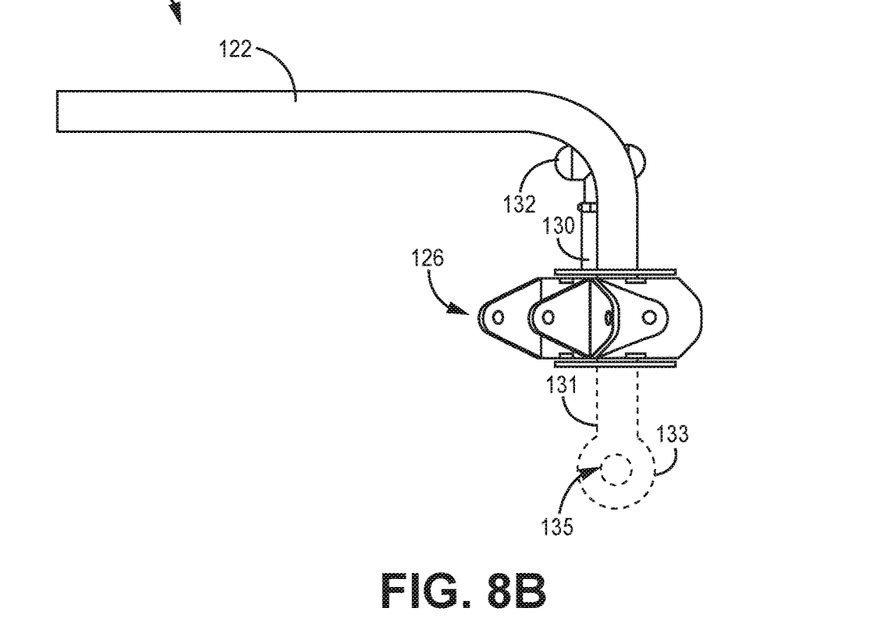
FIG. 8B is a side view of the rotary tool arm of FIG. 8A, according to one embodiment.
Figure 8C:
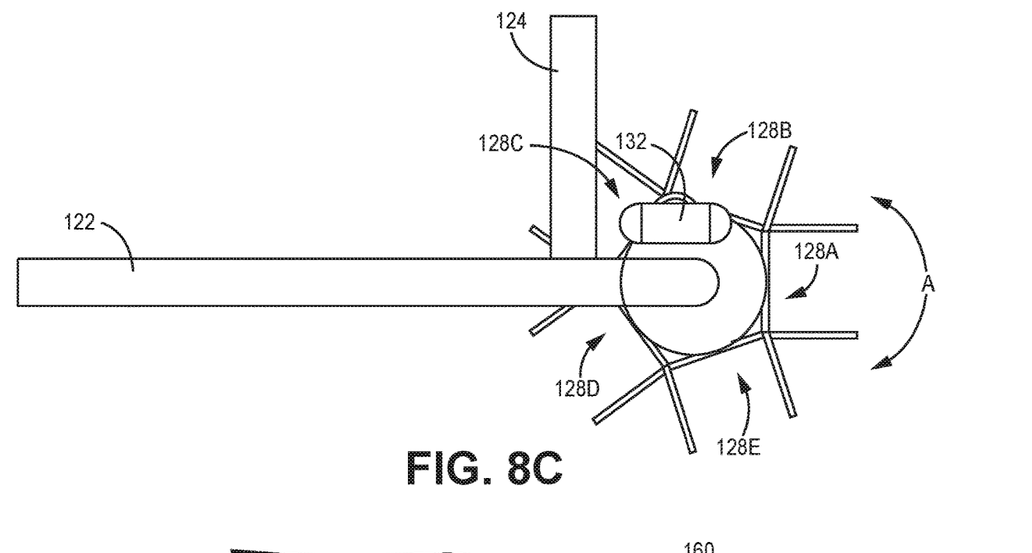
FIG. 8C is a top view of the rotary tool arm of FIG. 8A, according to one embodiment.

Another embodiment of a handle 120 for use with a prep stand (such as prep stand 90 discussed above, for example, or any other prep stand contemplated herein) is depicted in FIGS. 8A-8C. In this specific implementation, the handle 120 has a main handle 122, a side handle 124, and a rotatable multi-tool assembly 126 rotatably coupled to the main handle 122. The rotatable assembly 126 can contain one, two, three, four, five, or more different rotary tools (such as any of the tool embodiments disclosed or contemplated above) and can be rotated to select any of those tools for use by positioning the desired tool in the appropriate position, as described in further detail below. The side handle 124 is coupled to or integral with the main handle 122 and extends transversely from the main handle 122 such that the longitudinal axis of the side handle 124 is transverse to the longitudinal axis of the main handle 120. In this specific embodiment, the main handle 122 has a first or elongate or gripping section 134, a second or pivot or connection section 136, and a curved section 138. In this specific example, the longitudinal axis of the first section 134 is transverse to the longitudinal axis of the second section 136. Alternatively, the two sections 134, 136 need not be transverse in relation to each other. In a further alternative, the main handle 122 can have no curved section. The rotatable assembly 126 has a rotatable bracket wheel 128 and a locking mechanism 130, which in this specific instance is a pin 130 with a handle 132.

The rotatable bracket wheel 128 has two or more brackets formed thereon and is rotatable around the main handle 122 as shown by arrows designated as A in FIGS. 8A and 8C. For example, in the specific example depicted in FIGS. 8A-8C, the rotatable bracket wheel 128 has five brackets 128A, 128B, 128C, 128D, 128E, each of which can receive a different rotary tool. It is understood that each bracket can be configured and each rotary tool can be coupled to each bracket in the same fashion as described above with respect to the bracket 96 in FIGS. 7A-7C and related text. A user can rotate the wheel 128 by releasing the locking mechanism 130, position the wheel 128 as desired such that the desired bracket holding the desired rotary tool is facing the tire to be siped and then using the locking mechanism 130 to lock the wheel 128 in place.

As best shown in FIG. 8B, according to one embodiment, the handle 120 can have an extension arm 131 extending distally from the rotatable assembly 126. The arm 131 in this specific implementation can have a coupling component 133 at the distal end thereof. The coupling component 133 as shown is a rotatable bar hole 133 with a rotatable opening 135 similar to the rotatable bar hole 104 discussed above. The rotatable bar hole 133 couples to a known tire preparation stand by positioning the bar hole 133 over an appropriate bar of the tire preparation stand in a fashion similar to the handle 92 being coupled to the stand 90 as depicted and described above. Alternatively, any known coupling component 133 can be incorporated into or positioned at the distal end of the extension arm 131 for coupling to a known preparation stand or any other similar known tire repair equipment as discussed above. In a further alternative, the handle 120 does not have an extension arm 131 and instead is coupled to a known preparation stand or other known tire repair equipment via any known mechanical component or feature.

Like the handle 92 discussed above, this handle 120 implementation is configured to rotate in relation to a prep stand (such as, for example, the prep stand 90 discussed above), thereby allowing a user to rotate the handle 120 (and thus the rotatable assembly 126) in relation to the tire disposed on the prep stand, thereby allowing a user to position the desired rotary tool against the tire.

Figure 9A:
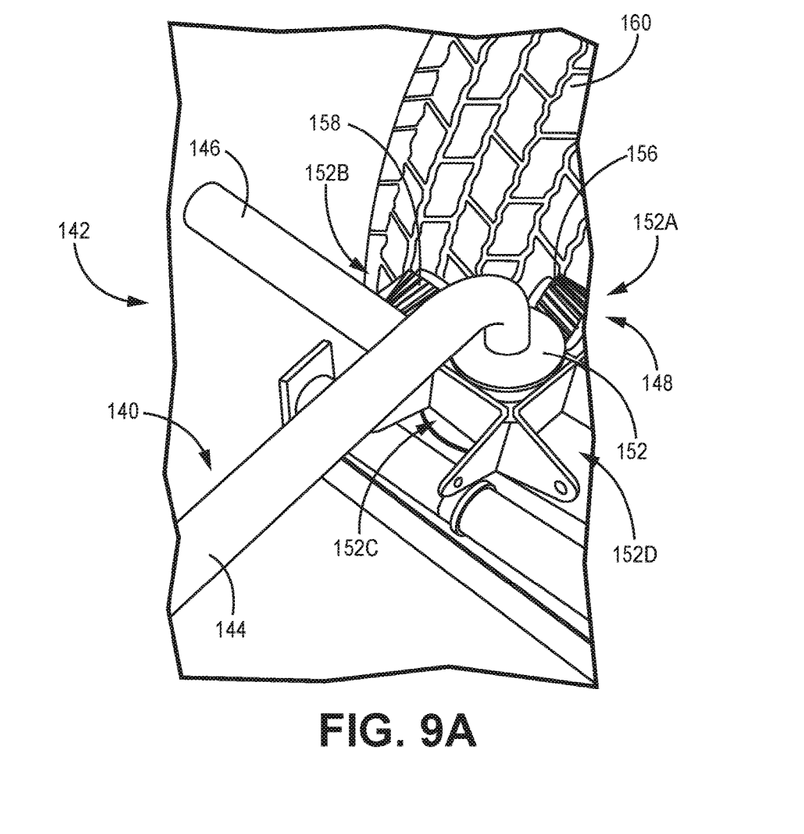
FIG. 9A is a perspective view of another rotary tool arm coupled to a known preparation stand, according to a further embodiment.
Figure 9B:
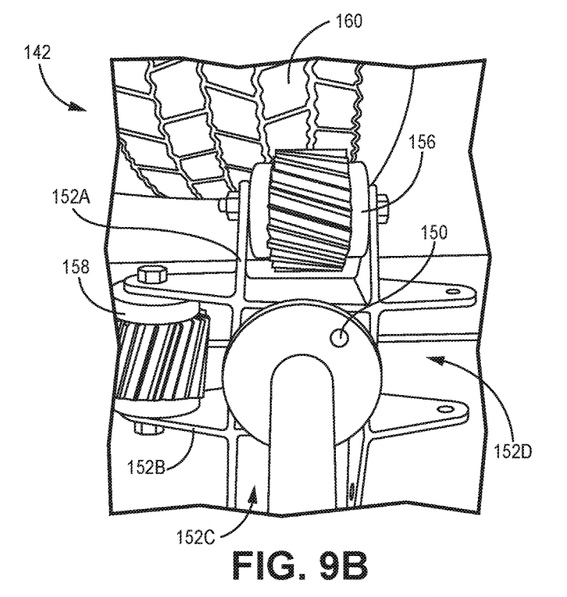
FIG. 9B is a top view of the rotatable bracket wheel of the rotary tool arm of FIG. 9A, according to one embodiment.
Figure 9C:
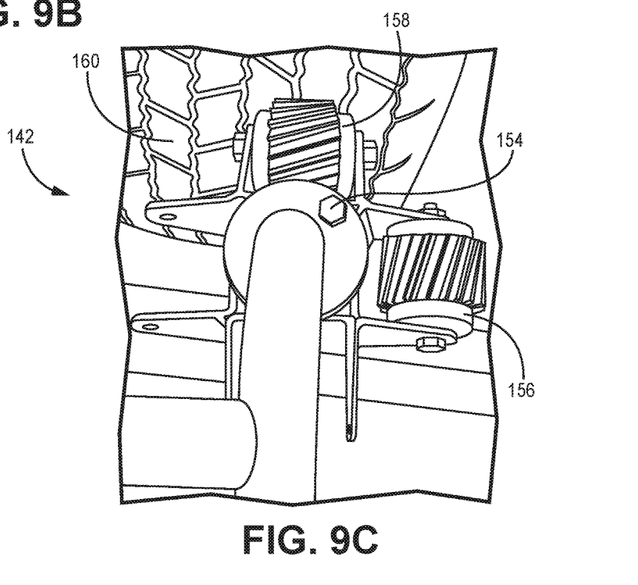
FIG. 9C is a top view of the rotatable bracket wheel of the rotary tool arm of FIG. 9A in a different position, according to one embodiment.

A further exemplary implementation is depicted in FIGS. 9A-9C, which includes a handle 140 rotatably coupled to a prep stand 142. The handle 140 has a main handle 144, a side handle 146, and a rotatable multi-tool assembly 148 rotatably coupled to the main handle 144. The rotatable assembly 148 can have a structure and/or a configuration similar to the assembly 126 discussed above. Similarly, the side handle 146 can be coupled to or integral with the main handle 144 in a fashion similar to the side handle 124 discussed above. Further, the main handle 144 can either be curved or straight in a fashion similar to the main handle 122 above.

In this embodiment, the rotatable assembly 148 has some different components or features in comparison to the assembly 126 discussed above. That is, the rotatable bracket wheel 152 has four brackets 152A, 152B, 152C, 152D, instead of five. Further, as best shown in FIG. 9C, the locking mechanism 154 is a bolt or pin 154 with no handle that is disposed through an opening 150 in the bracket wheel 152 to lock the wheel 152 in place. That is, when the pin 154 is placed through the opening 150, the wheel 152 is locked in the desired position that the wheel 152 is placed in prior to positioning the pin 154 in the opening 150. In contrast, when the pin 154 is removed from the opening 150, the wheel 152 can once again rotate in relation to the handle 140. In addition, the rotatable assembly 148 has two rotary tools 156, 158 disposed in two of the brackets 152A, 152B, thus leaving two brackets 152C, 152D empty. According to one embodiment as best shown in FIG. 9C, the first rotary tool 156 has blades disposed at one angle, while the blades of the second rotary tool 158 are disposed at a different angle, thereby providing two different options for use on different tires without having to add and remove the rotary tools 156, 158 from the prep stand 142.

In use, a tire 160 can be positioned on a prep stand 142, and the desired rotary tool can be selected for use by moving into the position closest to the tire 160. For example, as shown in FIGS. 9A and 9B, the rotatable bracket wheel 152 is rotated such that the rotary tool 156 is disposed in a position in which the tool 156 is facing the tire 160. Once the wheel 152 is positioned as desired, the pin 154 can be positioned in the opening 150 in the wheel 152, thereby locking the wheel 152 in position. Once the wheel 152 is locked, the tire 160 can be cut by the rotary tool 156 using the same or similar steps described above.

Further, if the other tool 158 is going to be used, the pin 154 is removed from the opening 150 and the rotatable bracket wheel 152 is rotated as shown in FIG. 9C such that the rotary tool 158 is disposed in a position in which the tool 158 is facing the tire 160. As above, once the wheel 152 is positioned as desired, the pin 154 can be positioned in the opening 150 in the wheel 152, thereby locking the wheel 152 in position. Once the wheel 152 is locked, the tire 160 can be cut by the rotary tool 158 using the same or similar steps described above.

Although the present invention has been described with reference to preferred embodiments, persons skilled in the art will recognize that changes may be made in form and detail without departing from the spirit and scope of the invention.

What is claimed is:

1. A rotary cutting apparatus comprising:
   (a) a cylindrical housing comprising an opening defined through a central axis of the cylindrical housing, wherein the housing is rotatable around the central axis and wherein the cylindrical housing comprising a plurality of slots defined around an outer surface of the cylindrical housing;
   (b) a plurality of blades coupled to and extending outward from an outer surface of the cylindrical housing, each of the blades disposed at an angle in relation to the central axis of the cylindrical housing, and wherein each of the plurality of blades is disposed in one of the plurality of slots; and
   (c) a rotatable bracket assembly comprising at least one bracket comprising an axle, wherein the axle is disposed within the opening, wherein the rotatable bracket assembly is rotatable about an axis non-coaxial with the axle.

2. The rotary cutting apparatus of claim 1, wherein the angle ranges from about 0 degrees to 25 degrees in relation to the central axis.

3. The rotary cutting apparatus of claim 1, wherein the angle is about 22.5 degrees in relation to the central axis.

4. The rotary cutting apparatus of claim 1, wherein the cutting apparatus is rotatably disposed in a bracket of a rotatable handle, wherein the rotatable handle is rotatably coupled to a tire prep stand.

5. The rotary cutting apparatus of claim 4, wherein each of the plurality of blades comprises:
   (i) a base disposed within one of the plurality of slots;
   (ii) a cutting portion extending from the base, wherein the cutting portion has a length that is shorter than a length of the base; and
   (iii) first and second shoulders defined at each end of the blade by the base and the cutting portion.

6. The rotary cutting apparatus of claim 5, further comprising first and second end caps, wherein the first end cap is disposed against a first side of the cylindrical housing and the second end cap is disposed against a second side of the cylindrical housing.

7. The rotary cutting apparatus of claim 6, wherein each of the first and second end caps comprises a lip, wherein each lip is disposed adjacent to one of the first and second shoulders.

8. A rotary cutting apparatus comprising:
   (a) a cylindrical housing comprising:
      (i) an opening defined through a central axis of the cylindrical housing, wherein the housing is rotatable around the central axis; and
      (ii) a plurality of slots defined around an outer surface of the cylindrical housing;
   (b) a plurality of blades positioned in the plurality of slots, each of the blades comprising:
      (i) a base disposed within one of the plurality of slots; and
      (ii) a cutting portion extending from the base, wherein the cutting portion is shorter than the base such that first and second shoulders are defined by the base and the cutting portion;
   (c) a first end cap disposed adjacent to a first side of the cylindrical housing, the first end cap comprising a first lip, the first lip configured to extend over an outer surface on the first side of the cylindrical housing and contact an outer portion of the cutting portion of each of the plurality of blades; and
   (d) a second end cap disposed adjacent to a second side of the cylindrical housing, the second end cap comprising a second lip, the second lip configured to extend over an outer surface on the second side of the cylindrical housing and contact an outer portion of the cutting portion of each of the plurality of blades.

9. The rotary cutting apparatus of claim 8, wherein the first lip is disposed adjacent to the first shoulder and the second lip is disposed adjacent to the second shoulder.

10. The rotary cutting apparatus of claim 8, wherein each of the first and second end caps comprises a hole in fluid communication with the opening of the cylindrical housing.

11. The rotary cutting apparatus of claim 8, wherein each of the plurality of slots is substantially parallel to adjacent slots of the plurality of slots.

12. The rotary cutting apparatus of claim 8, wherein each of the plurality of slots is disposed at an angle in relation to the central axis of the cylindrical housing.

13. The rotary cutting apparatus of claim 12, wherein the angle ranges from 0 degrees to 25 degrees in relation to the central axis.

14. A rotary cutting apparatus comprising:
   (a) a cylindrical housing comprising:
      (i) an opening defined through a central axis of the cylindrical housing, wherein the housing is rotatable around the central axis; and
      (ii) a plurality of slots defined around an outer surface of the cylindrical housing;
   (b) a plurality of blades positioned in the plurality of slots, each of the blades comprising:
      (i) a base disposed within one of the plurality of slots; and
      (ii) a cutting portion extending from the base, wherein the cutting portion is shorter than the base such that first and second shoulders are defined by the base and the cutting portion;
   (c) a first end cap disposed adjacent to a first side of the cylindrical housing and a second end cap disposed adjacent to a second side of the cylindrical housing such that each of the plurality of blades is disposed within one of the plurality of slots, wherein the cutting apparatus is rotatably disposed in a bracket of a rotatable handle, and wherein the rotatable handle is rotatably coupled to a tire prep stand.

15. The rotary cutting apparatus of claim 14, further comprising a rotatable bracket wheel, wherein the bracket is disposed on the rotatable bracket wheel.

16. The rotary cutting apparatus of claim 15, wherein the rotatable bracket wheel comprises a plurality of brackets, wherein an additional rotary cutting apparatus is disposed each of the plurality of brackets.

17. The rotary cutting apparatus of claim 15, further comprising a locking pin in operative communication with the rotatable bracket wheel, the locking pin configured to hold the rotatable bracket wheel in a desired position.

18. The rotary cutting apparatus of claim 17, wherein the locking pin further comprises a handle disposed on a first end of the locking pin.

19. The rotary cutting apparatus of claim 14, wherein the rotatable handle further comprises a side handle.

* * * * *